Aug. 18, 1964       M. B. HOLLANDER ETAL       3,144,710
                         FRICTION SEALING
                       Filed May 1, 1961
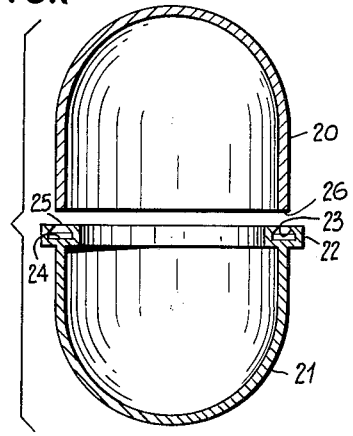
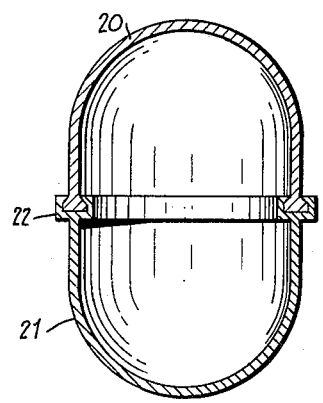
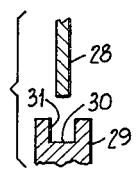 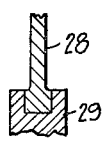 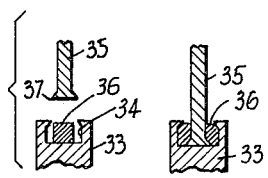 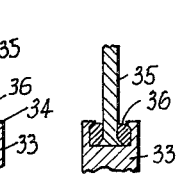 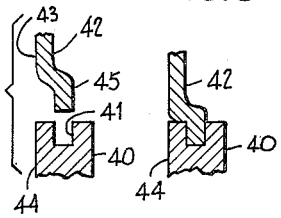 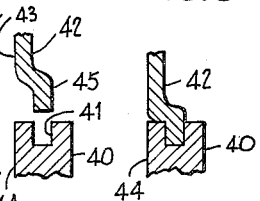
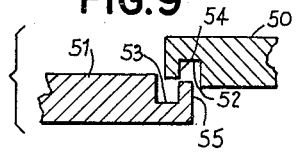 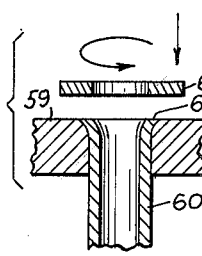 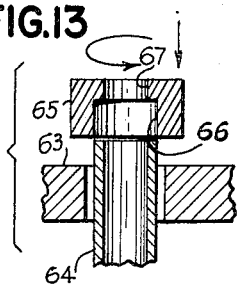
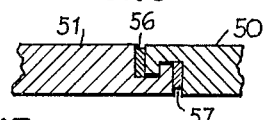
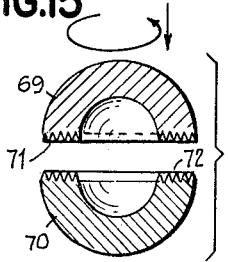 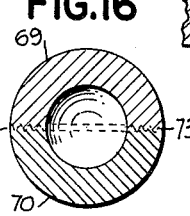 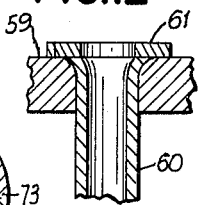 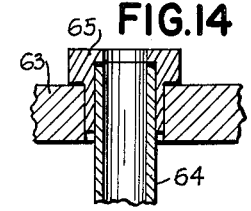
INVENTORS
MILTON BERNARD HOLLANDER
MICHAEL FRANCIS CAMPS-CAMPINS
BY
ATTORNEY United States Patent Office 3,144,710
Patented Aug. 18, 1964

3,144,710
FRICTION SEALING
Milton Bernard Hollander, Stamford, and Michael Francis Camps-Campins, Norwalk, Conn., assignors to American Machine & Foundry Company, a corporation of New Jersey
Filed May 1, 1961, Ser. No. 121,268
10 Claims. (Cl. 29—470.3)

This invention relates in general to welding, sealing or joining members as when forming a container.

An object of this invention is to provide a method whereby two members may be joined with a gas or fluid tight junction which is not likely to leak or fail under pressure and stress.

Another object of this invention is to provide a process for the friction sealing of metals in which plastic flow of metal in the sealed area at least partially provides a bond and a seal.

A further object of this invention is to provide a method whereby containers may be more rapidly, inexpensively, and effectively sealed.

A still further object of this invention is to provide a means whereby heat exchanger tubes, condenser tubes, or the like may be effectively and less expensively sealed within a tube sheet.

Many other objects, advantages and features of invention will become apparent from the following description and accompanying drawing wherein:

FIG. 1 is a vertical longitudinal section through two sections of a container prior to their being friction sealed;

FIG. 2 is a longitudinal vertical section through the two sections of the container of FIG. 1 after they are friction sealed according to this invention;

FIGS. 3, 5 and 7 are transverse sections through fragments of sets of elements prior to their being friction sealed;

FIGS. 4, 6 and 8 are transverse sections through the elements shown in FIGS. 3, 5 and 7 after they are friction sealed according to this invention;

FIG. 9 is a radial section through fragments of two members prior to their being friction sealed;

FIG. 10 is a radial section through the fragments of the members shown in FIG. 9 after they are friction sealed;

FIG. 11 is a longitudinal section through a fragment of one end of a boiler tube disposed within a fragment of a tube sheet with a sealing member shown disposed above it;

FIG. 12 is a longitudinal section through the fragment of the boiler tube shown in FIG. 11 after it is friction sealed within the fragment of the tube sheet;

FIG. 13 is a longitudinal section through a fragment of one end of a boiler tube extending through a fragment of a tube sheet with a sealing member shown disposed above it;

FIG. 14 is a longitudinal section through the fragment of the boiler tube shown in FIG. 13 after it is friction sealed within the fragment of the tube sheet;

FIG. 15 is a section through two halves of a hollow ball bearing ball prior to their being friction sealed; and FIG. 16 is a section through the two halves of the ball bearing ball after they have been friction sealed.

Referring to the drawing in detail, FIGS. 1 and 2 show the two sections 20 and 21 of a container or the like. The thicker upper portion 22 of section 21 contains a circular channel 23 which has a wider bottom portion 24 and a narrower top portion 25. If the top section 20 is rapidly rotated and forced downwards against the bottom section 21 so that the lower edge 26 of the top section extends into channel 23, frictional heat will be developed in the area of contact. If section 20 is formed from a material which has a lower melting point than the material of section 21, the lower edge 26 of section 20 will become plastic and flow to fill the circular channel 23 as shown in FIG. 2. Upon the rapid stopping of the relative rotation between sections 20 and 21, the plastic material of lower edge 26 will cool and harden to seal section 20 to section 21 as shown in FIG. 2.

Friction sealing differs from conventional friction welding in that metal members may be joined without their necessarily forming a true weld in the sealed area. Depending upon the metals from which the sections 20 and 21 are fabricated, the lower edge 26 of section 20 may become welded to the bottom of channel 23. In such a case, however, the plastic flow of the material of section 20 within channel 23 as shown in FIG. 2 serves to seal and reinforce the weld in the sealed area. Even if the sections 20 and 21 are fabricated from the same metal such as aluminum or an aluminum alloy, the relatively more massive thicker upper portion 22 will not become entirely plastic as does the lower edge 26 of section 20. Thus friction sealing may be accomplished between sections fabricated from the same metal.

Referring now to FIGS. 3 and 4, a lower section 29 contains an upwardly facing circular channel 30 with perpendicular walls 31 which are not undercut. An upper section 28 is rapidly rotated and forced downward into channel 30 to seal sections 28 and 29 in the manner described. Depending upon the metals from which the sections 28 and 29 are fabricated, a suitable mechanical, brazed, soldered or welded bond may be formed to seal the sections 28 and 29 as shown in FIG. 4. To increase the strength of this bond, the vertical side walls 31 of channel 30 may be roughened or scored.

Referring now to FIGS. 5 and 6, a lower section 33 which contains a circular channel 34 may have an upper section 35 friction sealed to it by means of a ring 36. As an example, if the sections 33 and 35 were of steel, the ring 36 could be of a low melting lead solder which would be melted by frictional heat generated on its being contacted by the lower edge 37 of section 35. The solder of ring 36 would then flow about the lower edge 37 of section 35 to lock it within the channel 34 as shown in FIG. 6. While FIGS. 5 and 6 show a wider lower edge 37 of section 35 and show channel 34 undercut, the wider lower edge and the undercut of the channel are extra features not required unless the sealed sections 33 and 35 are subjected to great stresses.

FIGS. 7 and 8 show a further modification of the invention in which a section 40 containing a circular channel 41 has a thin walled section 42 sealed to it. If it is desired to have the outer surfaces 43 and 44 of the sections 42 and 40 intersect smoothly, the lower edge 45 of section 42 may be offset inwardly as shown in FIG. 7. When section 42 is rapidly rotated and the offset 45 is forced downward into the channel 41, heat generated by friction will cause the metal of section 42 within the channel 41 to become plastic and, if the friction sealing cycle is properly controlled, the combination of heat and pressure will allow the bottom edge 45 of section 42 to deform as shown in FIG. 8. This enables surfaces 43 and 44 to intersect smoothly. In the case of manufactured articles such as cannisters and the like in which a thin walled upper section is sealed to a heavier base, the smooth intersection of the outer surfaces 43 and 44 is aesthetically desirable and enhances the sales appeal of the articles.

Referring now to FIGS. 9 and 10, a circular disk 50 may be sealed within a circular aperture in a plate 51. The lower outer edge of disk 50 contains a channel 52 while the upper inner edge of the plate 51 contains a channel 53. If the disk 50 is rapidly rotated and forced downwardly so that the channels 52 and 53 interlock, frictional heat will render the metal of the walls 54 and 55 of the channels 52 and 53 plastic. As shown in FIG. 10 in exaggerated form, plastic metal 56 from wall 54 and plastic metal 57 from wall 55 will flow and at least partially fill the remaining portions of channels 53 and 54 to seal the disk 50 within the circular aperture in plate 51.

FIG. 11 shows a steel tube sheet 59 which has a copper condenser tube 60 extending through it. The tube 60 may be flared to hold it within the tube sheet. A sealing ring 61, which may be of copper or a metal of a lower melting point, is rapidly rotated and forced against the flared end of tube 60 and the adjacent surface of tube sheet 59. Frictional heat will render metal in the area of contact plastic or liquid so that ring 61 will become friction welded over the end of tube 60 and tube sheet 59. Should there be slight clearance between the flared end of tube 60 and tube sheet 59, liquid or plastic metal will flow between tube 60 and tube sheet 59 to seal the tube within the tube sheet. This is a particularly satisfactory way to seal tubes within a tube sheet as a simple and easily portable apparatus may be devised to rotate the sealing rings 61 and force them against the ends of the tubes and the adjacent surface of the tube sheet.

Referring now to FIGS. 13 and 14, a tube 64 extends through tube sheet 63 with a slight clearance. If the tube 64 projects a short distance beyond the surface of the tube sheet, it may serve to center the sealing ring 65 about it. Sealing ring 65 contains a concentric circular opening 66 which is slightly larger in diameter than the end of tube 64. Channel 67 extends through sealing ring 65 and communicates with opening 66. Therefore, when sealing ring 65 is rotated and forced downwards against the end of tube 64 and the surface of tube sheet 63, opening 66 fits about the projecting end of tube 64 and positions it for a friction sealing operation. As shown in FIG. 14, if there is a clearance between tube 64 and tube sheet 63, the frictional sealing operation will render the material of the sealing ring 65 plastic so that it may flow between tube 64 and tube sheet 63 to seal them. If tube sheet 63 is of steel and tube 64 is copper, the sealing rings 65 may be of copper or of a metal alloy having a lower melting point depending upon the service conditions encountered.

FIGS. 15 and 16 show the friction sealing or friction welding of two hemispherical elements 69 and 70 to form a hollow ball bearing ball. In certain uses for ball bearings, as when they are used in aircraft and the like, weight and elasticity are of prime importance. The weight or apparent stiffness of a ball bearing may be substantially reduced if it is assembled using hollow balls. Heretofore, hollow ball bearing balls have been exceedingly difficult to fabricate as they must be made to close tolerances and their weight distribution must be fairly even. As shown in FIG. 15, the hemisphere 69 has a number of grooves 71 formed on its lower edge while the hemisphere 70 has the corresponding grooves 72 formed on its upper edge. If the hemispheres 69 and 70 are rapidly rotated relative to each other and forced together, they may be friction welded with a small amount of flash or upset 73 which may be easily ground off or otherwise removed in a final surfacing operation. The grooves 71 and 72 serve both to increase the sealed or welded area between the hemispheres 69 and 70 and they also serve to locate the hemispheres 69 and 70 relative to each other during their rotation to generate frictional heat.

What is claimed is:

1. The process of joining two metal members comprising the steps of providing a circular groove in a first member and a circular edge on a second member, rotating the members relative to each other, forcing the circular edge of the second member into the groove in the first member until frictional heat renders material within the groove plastic, rapidly stopping the relative rotation of the members, and allowing the plastic material within the groove to solidify and form a seal between the members.

2. The process according to claim 1 wherein the circular groove is formed with an undercut.

3. The process of joining two metal members comprising the steps of forming a circular groove in a first member and a circular edge on a second member, placing a ring of metal material having a lower melting point in the groove, rotating the members relative to each other, forcing the circular edge of the second member into the groove in the first member until frictional heat makes at least the ring in the groove plastic, stopping the relative rotation of the members, allowing the plastic material within the groove to cool forming at least a mechanical bond between the members.

4. The combination according to claim 3 in which the groove in said first member is undercut and in which the circular edge of the second member has an enlarged end portion.

5. The process of joining metal members comprising the steps of forming a circular groove in the end of a first member, forming a circular edge with an offset on the end of and extending from a second member, rotating the members relative to each other, forcing the offset edge of the second member into the groove of the first member during relative rotation until frictional heat renders the offset edge plastic, rapidly stopping the relative rotation between the members, and forcing the members together so that the offset edge deforms and the ends of the members meet.

6. The process of sealing a metal tube within a metal tube sheet comprising the steps of inserting the tube through a hole in the tube sheet with a small clearance, rotating a metal sealing ring beyond the end of the tube, forcing the rotating sealing ring against the end of the tube and the tube sheet until material becomes plastic in the area of contact with the tube and the tube sheet, allowing plastic material to flow between the tube and the tube sheet, and rapidly stopping the rotation of the sealing ring while continuing to force it against the end of the tube and the tube sheet.

7. The process of sealing a metal tube within a metal tube sheet comprising the steps of inserting the tube through a hole in the tube sheet with a small clearance, rotating a metal sealing ring of an internal diameter slightly greater than the external diameter of the tube, moving the rotating sealing ring over the end of the tube and forcing the rotating sealing ring against the end of the tube sheet until the sealing ring becomes plastic in the area of contact with the tube and the tube sheet, allowing plastic material from the sealing ring to flow between the tube and the tube sheet, and rapidly stopping the rotation of the sealing ring while continuing to force it against the end of the tube sheet.

8. The process of sealing a tube in a metal tube sheet provided with metal tube holes comprising the steps of inserting the tube through a hole and slightly beyond the tube sheet, forming an opening in one side of a metal sealing ring of slightly larger diameter than the end of the projecting tube, placing the opening in the sealing ring over the end of the tube, rapidly rotating the sealing ring, forcing the sealing ring against the adjacent surface of the tube sheet and the tube until the sealing ring becomes plastic in the area of contact with the tube and the tube sheet, allowing plastic material of the sealing ring to flow between the tube and tube sheet, and rapidly stopping the rotation of the sealing ring.

9. The process of sealing a metal tube in a metal tube sheet comprising tightly fitting a tube through a hole in said tube sheet until the end of said tube is substantially flush with the edge of said hole, rotating a metal sealing member across said tube sheet in contact with the end of said tube and the adjacent surface of the tube sheet until frictional heat makes a plastic seal at the end of said tube between said tube and said tube sheet, and thereafter rapidly stopping rotation and cooling the tube and tube sheet.

10. The process of friction welding metal workpieces comprising urging a single metal workpiece in one direction against a plurality of metal workpieces which have adjacent coplanar portions, rotating the single workpiece and the plurality of workpieces relative to each other in contact with all said adjacent coplanar portions until the rubbing surfaces are rendered plastic by frictional heat, thereafter stopping rotation and maintaining a forging pressure between the workpieces while the workpieces cool.

References Cited in the file of this patent

UNITED STATES PATENTS

| | | |
|---|---|---|
| 1,291,600 | Murray | Jan. 14, 1919 |
| 1,648,026 | Murray | Nov. 8, 1927 |
| 1,691,778 | McDonald | Nov. 13, 1928 |
| 2,506,687 | Scherrer | May 9, 1950 |

FOREIGN PATENTS

| | | |
|---|---|---|
| 476,480 | Germany | May 21, 1929 |
| 572,789 | Great Britain | Oct. 24, 1945 |